United States Patent
Valdetaro

(10) Patent No.: US 9,710,425 B2
(45) Date of Patent: *Jul. 18, 2017

(54) MOBILE PROXY SERVER FOR INTERNET SERVER HAVING A DYNAMIC IP ADDRESS

(75) Inventor: Luiz Claudio Valdetaro, Coppell, TX (US)

(73) Assignee: Vertical Computer Systems, Inc., Richardson, TX (US)

(*) Notice: Subject to any disclaimer, the term of this patent is extended or adjusted under 35 U.S.C. 154(b) by 356 days.

This patent is subject to a terminal disclaimer.

(21) Appl. No.: 13/436,514

(22) Filed: Mar. 30, 2012

(65) Prior Publication Data

US 2013/0097225 A1    Apr. 18, 2013

Related U.S. Application Data

(63) Continuation-in-part of application No. 12/966,741, filed on Dec. 13, 2010, now Pat. No. 9,112,832.

(60) Provisional application No. 61/470,474, filed on Mar. 31, 2011.

(51) Int. Cl.
| | | |
|---|---|---|
| G06F 15/16 | (2006.01) | |
| H04L 29/12 | (2006.01) | |
| H04L 29/08 | (2006.01) | |
| H04W 8/08 | (2009.01) | |

(52) U.S. Cl.
CPC .......... *G06F 15/16* (2013.01); *H04L 61/1511* (2013.01); *H04L 61/2076* (2013.01); *H04L 67/02* (2013.01); *H04W 8/08* (2013.01)

(58) Field of Classification Search
CPC ................................. G06F 15/16; H04W 4/00
USPC ......................................... 709/203; 455/414.3
See application file for complete search history.

(56) References Cited

U.S. PATENT DOCUMENTS

| | | | |
|---|---|---|---|
| 6,647,001 B1 | 11/2003 | Bhagavath | |
| 6,766,349 B1 | 7/2004 | Belkin | |
| 6,993,569 B1 | 1/2006 | Rees, Jr. | |
| 7,039,708 B1 | 5/2006 | Knobi et al. | |
| 7,334,126 B1 | 2/2008 | Gilmore et al. | |
| 7,814,208 B2 | 10/2010 | Stephenson et al. | |
| 8,024,227 B2* | 9/2011 | Howard et al. | 705/26.1 |
| 8,190,773 B2 | 5/2012 | Wikman et al. | |
| 8,254,896 B2* | 8/2012 | Lazaridis | 455/414.3 |
| 2002/0116638 A1* | 8/2002 | Dobes | G06Q 30/02 726/1 |
| 2003/0191970 A1 | 10/2003 | Devine et al. | |

(Continued)

FOREIGN PATENT DOCUMENTS

WO    02/067540 A1    8/2002

OTHER PUBLICATIONS

Henderson, Thomas R., "Host Mobility for IP Networks: A Comparison", IEEE Network, Nov./Dec. 2003, pp. 18-26, vol. 17, No. 6, IEEE Service Center, New York, NY, US.

(Continued)

*Primary Examiner* — Vivek Srivastava
*Assistant Examiner* — Hermon Asres
(74) *Attorney, Agent, or Firm* — Jack D. Stone, Jr.; Scheef & Stone, L.L.P.

(57) ABSTRACT

A system for connecting to a mobile web server having a dynamic IP address includes a mobile proxy (MP) server connectable to the client software, the MP server including a proxy server software and an IP agent server. An Internet device is connectable to the MP server, and includes a mobile web server and an IP agent client.

20 Claims, 4 Drawing Sheets

(56) References Cited

U.S. PATENT DOCUMENTS

| | | | |
|---|---|---|---|
| 2004/0179537 A1* | 9/2004 | Boyd | H04L 29/06 370/395.54 |
| 2006/0031929 A1 | 2/2006 | Saito | |
| 2006/0101145 A1 | 5/2006 | Hoffman et al. | |
| 2007/0022164 A1 | 1/2007 | Nog et al. | |
| 2007/0203970 A1 | 8/2007 | Nguyen | |
| 2008/0028078 A1 | 1/2008 | Saiki et al. | |
| 2008/0148286 A1 | 6/2008 | Hetrick | |
| 2008/0172449 A1 | 7/2008 | Bengtsson et al. | |
| 2010/0023611 A1* | 1/2010 | Yang | H04L 29/12066 709/223 |
| 2010/0131583 A1* | 5/2010 | Lee | H04L 67/2861 709/202 |
| 2010/0293564 A1 | 11/2010 | Gould et al. | |
| 2011/0119600 A1 | 5/2011 | Liu et al. | |
| 2012/0144475 A1* | 6/2012 | Boire-Lavigne et al. | 726/11 |
| 2013/0138836 A1 | 5/2013 | Cohen et al. | |

OTHER PUBLICATIONS

Wikman, Johan and Dosa, Ferenc, "Providing HTTP Access to Web Servers Running on Mobile Phones", Nokia Research Center Helsinki, http://research.nokia.com, NRC-TR-2006-005, May 24, 2006, 6 pp., XP-002435345.

Zimmerly, Bill; A Tiny Cloud in Android: Exploring the Android file system from your browser, Internet article, Nov. 17, 2009, pp. 1-12, XP002673823, http://www.ibm.com/developerworks/opensource/library/os-tinycloud/index.htm.

* cited by examiner

MOBILE PROXY SERVER FOR INTERNET SERVER HAVING A DYNAMIC IP ADDRESS

CROSS-REFERENCE TO RELATED APPLICATIONS

This application is a continuation-in-part of U.S. Pat. No. 9,112,832, application Ser. No. 12/966,741, filed Dec. 13, 2010, and issued Aug. 15, 2015, and claims the benefit of provisional Application No. 61/470,474, filed Mar. 31, 2011, both of which applications are incorporated by reference herein in their entirety.

TECHNICAL FIELD

The invention relates generally to communications and, more particularly, to communications with a device having a dynamic IP address.

BACKGROUND

Conventionally, a web server is stationary and is accessible by way of a static IP address. A user who desires to connect to the web server may do so by way of a web browser which connects directly to the web server. Alternatively, if a user wishes to appear anonymous to a web server, the user may access the web server via a proxy server (also with a static IP address) that accesses the web server, and wherein the proxy server may or may not be transparent to the user of the web browser. A drawback with such methods is that the web server must preferably remain stationary with a static IP address. If the web server moves, it will often be assigned a new IP address, and will have to update the Domain Name Server (DNS) with the new IP address, which is then propagated through the Internet, which could take several hours or even days. Until the new IP address is propagated through the Internet, a user may not be able to access the web server depending on where the user is.

If a web server is operated from a mobile Internet device, such as a cell phone, which may be constantly changing locations, so that a new IP address is assigned before a previous IP address is even propagated through the Internet, then the web server may become, for all practical intents and purposes, totally inaccessible. There is, therefore, a need to enable mobile web servers to be able to move and be assigned new IP addresses without incurring extended delays in accessibility while the new IP address is propagating through the Internet.

SUMMARY

Accordingly, the present invention provides for a system for connecting a web browser to one or more web servers having a dynamic IP address. The system includes a mobile proxy (MP) server connectable to the web browser, the MP server including proxy server software and IP agent server software. One or more Internet devices (ID's) are connectable to the MP server, and each ID includes respective web server software and IP agent client software.

The MP server software includes computer program code for receiving and storing the IP address of the web server, for receiving an HTTP request, for forwarding the HTTP request to the web server, for receiving a response from the web server, and for forwarding the response to the web browser.

The IP agent client software includes computer program code for determining when the IP address of the ID has changed and storing the changed IP address, and for forwarding the changed IP address to the IP agent server.

The IP agent server software includes computer program code for receiving the changed IP address of the (ID), and for sending the changed IP address to the mobile proxy server.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

It is noted that, unless indicated otherwise, all functions described herein may be performed by a processor, such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development and implementation details of all such code would be apparent to a person having ordinary skill in the art based upon a review of the present description of the invention. Still further, it is understood that where the term "software" is used without associated hardware required to execute the software, such associated hardware is implicitly included with the software.

Figure 1:
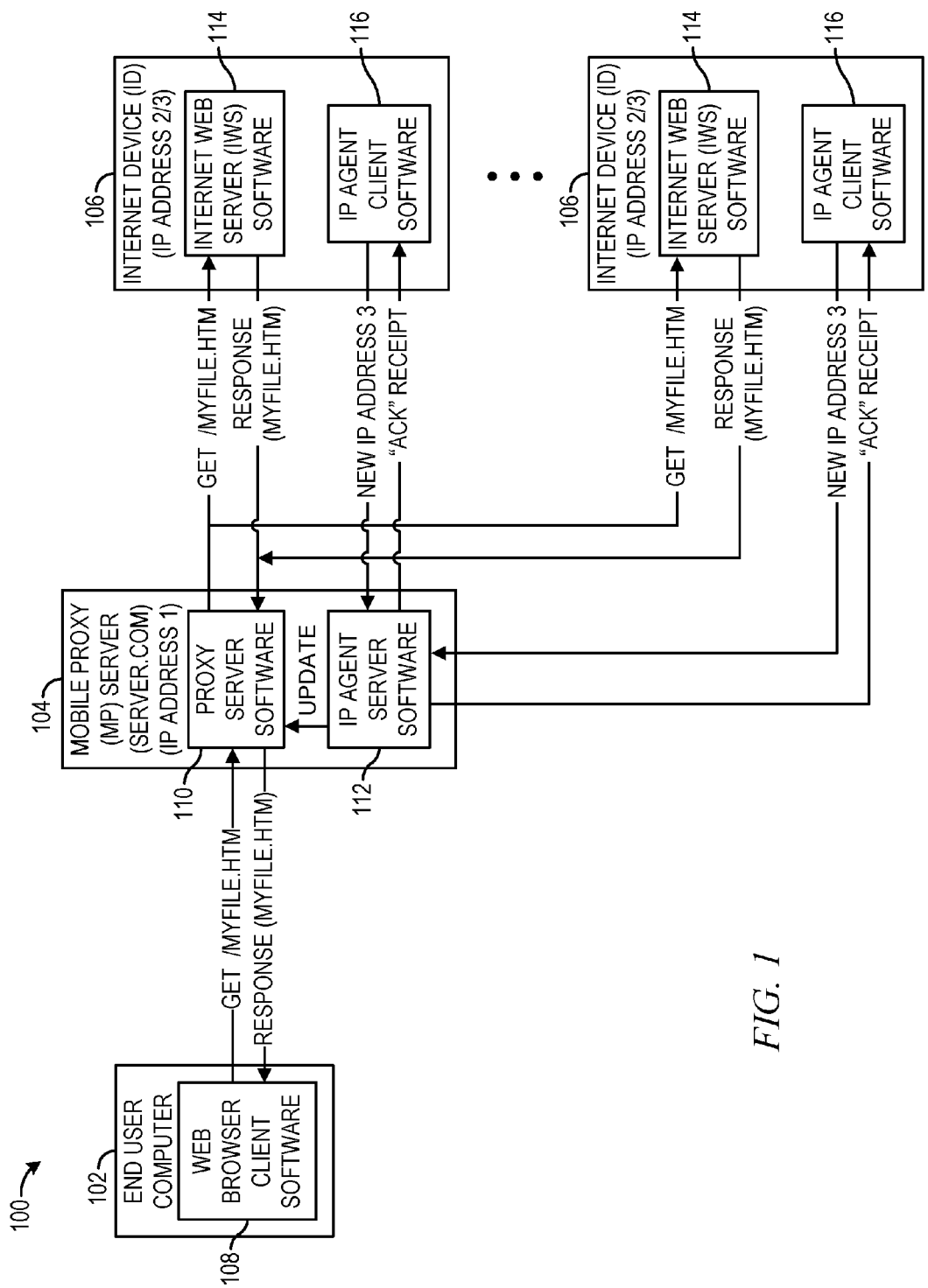
FIG. 1 is a high-level conceptual block diagram illustrating one embodiment for effecting wireless communications with a mobile web server in accordance with principles of the present invention.

Referring to FIG. 1 of the drawings, the reference numeral 100 generally designates a system embodying features of the present invention for effecting communications with a web server, which server may be mobile. The system 100 includes an end user computer 102, a mobile proxy (MP) server 104, and one or more Internet devices (ID's) 106. The computer 102 is preferably configured using web browser client software 108 to function as an Internet web browser, though it is not limited to performing such functions. The MP server 104 is preferably configured for functioning as a proxy server using proxy server software 110, and as an Internet Protocol (IP) agent server using IP agent server software 112, though it is not limited to performing such functions, and it is assigned a static IP address, exemplified herein as IP ADDRESS 1, with a domain name "SERVER.COM". Each ID 106 is preferably configured for functioning as a regular web server computer on Dynamic Host Configuration Protocol (DHCP), effective as an Internet web server (IWS) using IWS software 114, and as an IP agent client using IP agent client software 116, though it is not limited to performing such functions, and it is assigned a dynamic IP address, exemplified herein as IP ADDRESS 2. While each ID 106 and respective IWS software 114 would typically constitute a mobile Internet device and mobile Internet web server (also referred to herein as simply a "mobile web server"), respectively, they could also constitute a stationary Internet device and stationary Internet web server as well.

The web browser client software 108 and the proxy server software 110 are coupled together via any conventional communications link well known in the industry, such as wireline or wireless Internet or the like. The proxy server software 110 and each IWS software 114 are preferably coupled together via a wireless communications link, such as a conventional wireless cellular communications link, effective for enabling each ID 106 to host a mobile Internet server. Similarly, the IP agent server software 112 and each IP agent client software 116 are preferably coupled together using the same communications link as between the proxy server software 110 and each IWS software 114, namely, via a wireless communications link, such as conventional wireless cellular communications.

Figure 2:
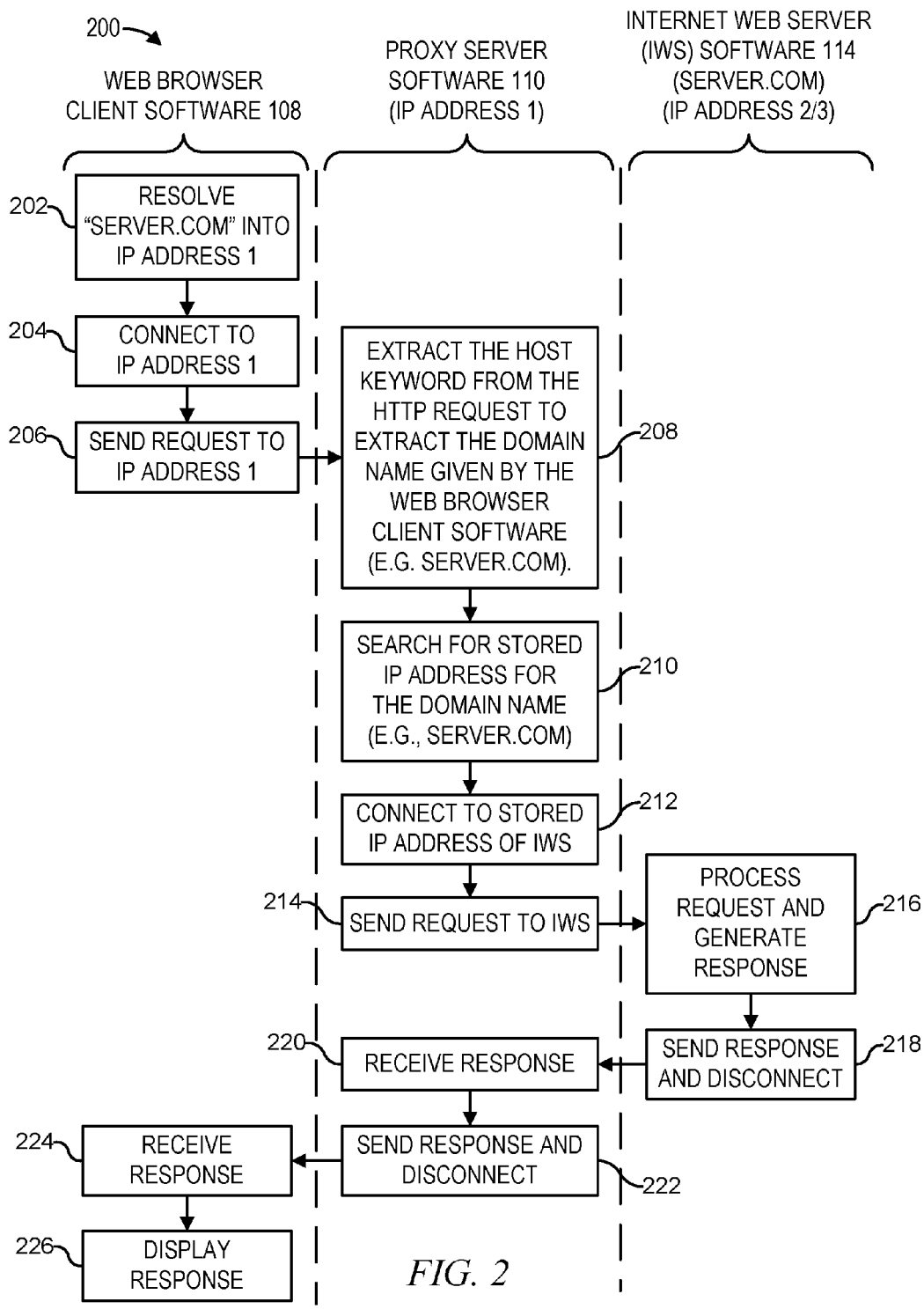
FIG. 2 depicts a flow chart illustrating control logic embodying features of the present invention for accessing a mobile web server.
Figure 3:
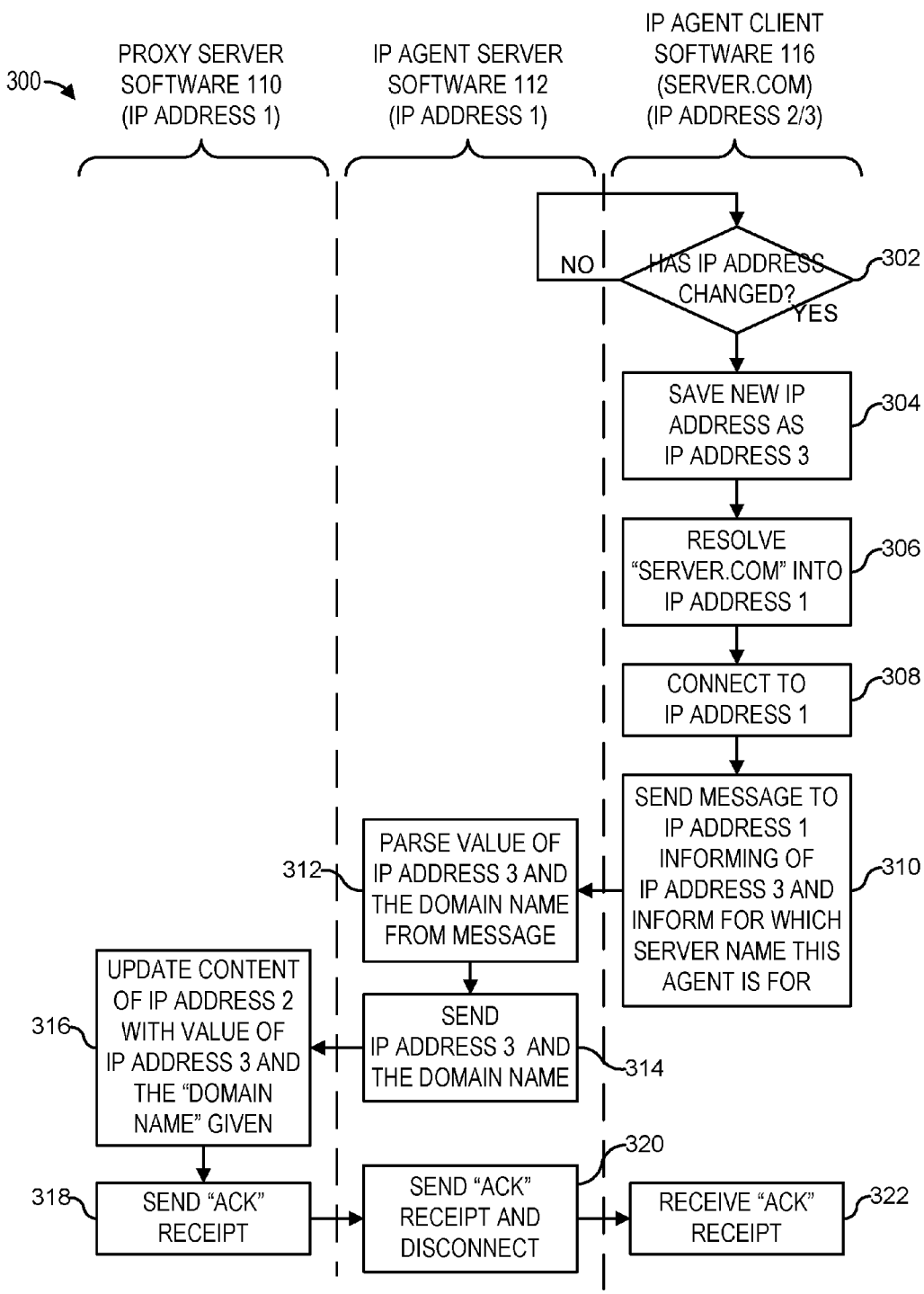
FIG. 3 depicts a flow chart illustrating control logic embodying features of the present invention for updating a mobile proxy server with the IP address of a mobile web server.

FIGS. 2 and 3 are flow charts of preferred control logic implemented by the system 100 for executing messaging and event sequences according to principles of the present invention. With reference to FIG. 2, in step 202, the web browser client software 108 of the end user computer 102 receives a request from an end user (or simply "user", not shown) for a HyperText Markup Language (HTML) file residing with the IWS software 114. For the sake of illustration, the HTML file will be referred to herein as MYFILE.HTM which the user requests by typing HTTP://SERVER.COM/MYFILE.HTM into the computer 102. In response, the web browser client software 108 resolves SERVER.COM into IP ADDRESS 1, the IP address for the proxy server software 110. In step 204, the computer 102 connects via a communication link to the proxy server software 110 at IP ADDRESS 1. In step 206, the client software 108 sends to IP ADDRESS 1 a HyperText Transfer Protocol (HTTP) request to GET (or POST) /MYFILE.HTM.

In step 208, the proxy server software 110 receives the HTTP request for /MYFILE.HTM and extracts the host keyword from the HTTP request to extract the domain name (e.g., SERVER.COM) given by the web browser client software 108, such as SERVER.COM. In step 210, the proxy server software 110 searches memory (not shown) residing on the MP server 104 for the IP address stored for the domain name (e.g., SERVER.COM). In step 212, the proxy server software 110 connects to the IP address, referred to herein as IP ADDRESS 2, that it has stored, as discussed in further detail below with respect to FIG. 3, for a respective ID 106 and, in particular, for a respective IWS software 114. Should the proxy server software 110 be unable to connect to the respective IWS software 114 because the IP address of the respective IWS software 114 has changed but not yet been communicated to the proxy server software 110, then the proxy server software 110 preferably waits until it is updated with the new IP address of the respective IWS software 114 (as discussed below with respect to FIG. 3), and upon being updated, attempts to reconnect with the respective IWS software 114. In step 214, the proxy server software 110 sends to the respective IWS software 114 the HTTP request, received and preferably unmodified from the web browser 102.

In step 216, the respective IWS software 114 receives the HTTP request from the proxy server software 110, processes the request in a conventional manner, and generates a response, including the requested file MYFILE.HTM. In step 218, the respective IWS software 114 sends the response to the proxy server software 110 and disconnects from the proxy server software 110.

In step 220, the proxy server software 110 receives the response from the respective IWS software 114. In step 222, the proxy server software 110 forwards the response to the web browser client software 108 and disconnects from the web browser client software 108.

In step 224, the web browser client software 108 receives the response from the proxy server software 110. In step 226, the computer 102 displays via a monitor (not shown) the MYFILE.HTM file to the user that requested it.

FIG. 3 exemplifies how a change in the IP Address of an ID 106 is effectuated in the proxy server software 110. Accordingly, in step 302, each IP agent client software 116 checks to determine whether the IP address of a respective ID 106 has changed. If a respective IP agent client software 116 determines that the IP address of the respective ID 106 has not changed, then execution returns/remains at step 302. If the respective IP agent client software 116 determines that the IP address of the respective ID 106 has changed, then execution proceeds to step 304 in which the new IP address of the respective ID 106 is saved as IP ADDRESS 3. In step 306, the respective IP agent client software 116 resolves the SERVER.COM domain name into IP ADDRESS 1 and, in step 308, connects to IP ADDRESS 1. In step 310, the respective IP agent client software 116 sends a message to the IP agent server software 112 at IP ADDRESS 1 informing the IP agent server software 112 of the IP ADDRESS 3 of the respective ID 106 and the domain name represented by the respective IP agent client software 116. As a matter of protocol, the IP ADDRESS 3 is preferably embedded within the header or footer of the message, but may optionally also be included within the body of the content of the message.

In step 312, the IP agent server software 112 receives the message from the IP agent client software 116 and parses the value of the IP ADDRESS 3 and the domain name from the message. In step 314, the IP agent server software 112 sends the IP ADDRESS 3 and domain name to the proxy server software 110. In step 316, the proxy server software 110 updates the IP ADDRESS 2 with the value of the IP ADDRESS 3 and the domain name given so that subsequent HTTP requests to IP ADDRESS 2 will be properly directed to the respective IWS software 114 of the respective ID 106. In step 318, the proxy server software 110 sends an "ACK" receipt to the IP agent server software 112, acknowledging that the IP ADDRESS 2 has been updated. In step 320, the IP agent server software 112 receives the "ACK" receipt from the proxy server software 110, sends an "ACK" receipt to the respective IP agent client software 116 acknowledging that the IP ADDRESS 2 stored in the proxy server software 110 has been updated with the value of the IP ADDRESS 3, and then it disconnects from the respective IP agent client software 116. In step 322, the IP agent client software 116 receives the ACK receipt.

Figure 4:
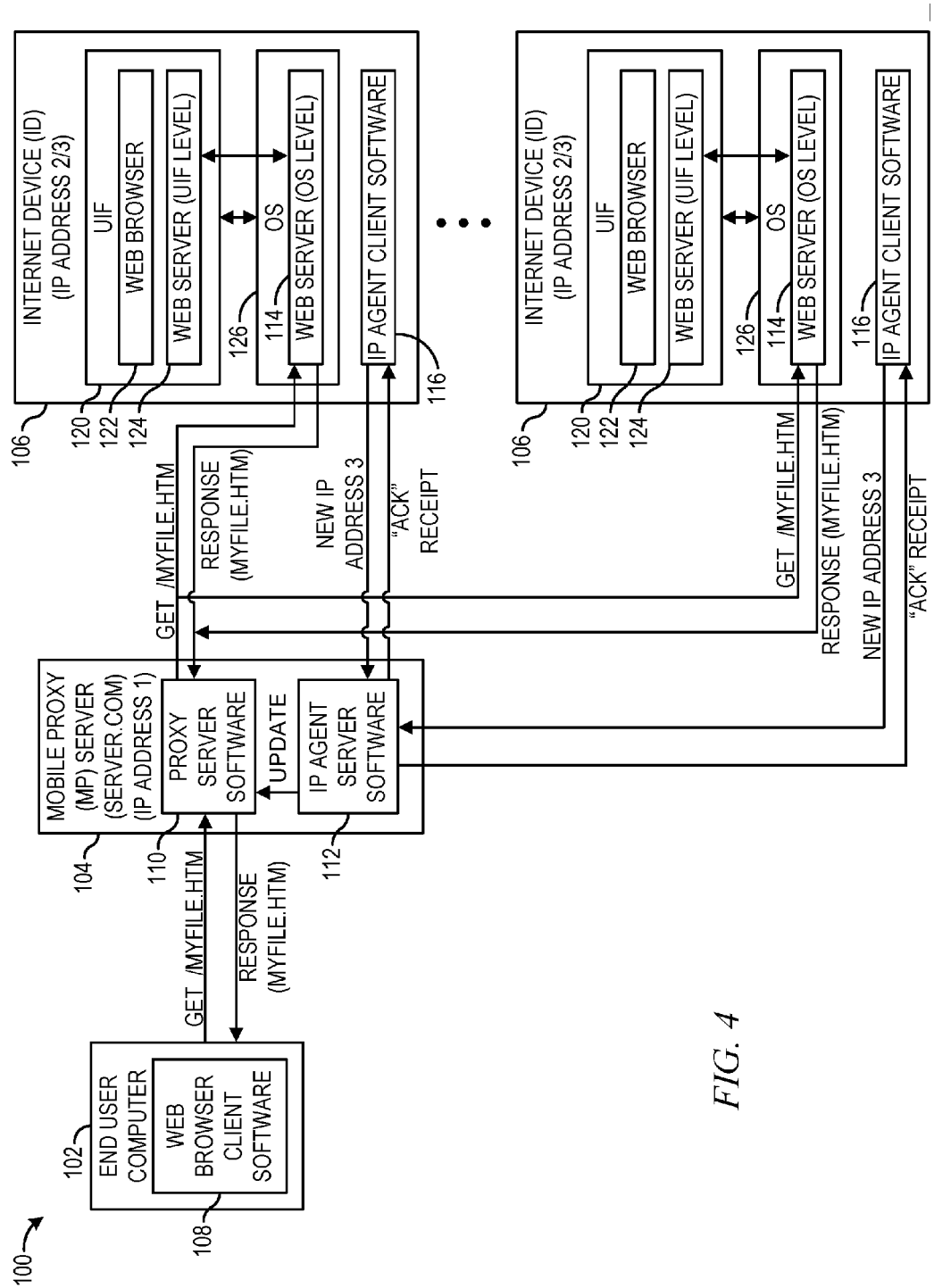
FIG. 4 is a high-level conceptual block diagram illustrating an alternative embodiment for effecting wireless communications with an Internet device having both an operating system and a user interface framework in according with principles of the present invention.

FIG. 4 exemplifies an alternate embodiment of the invention, as discussed in U.S. Pat. No. 9,112,832, wherein ID 106 is provided with an operating system (OS) 126 and a user interface framework (UIF) 120 coupled to OS 126. UIF 120 preferably includes a web browser 122 and at least one object library. ID 106 is operable at an OS level and at a UIF level, with the OS level being distinct from the UIF level. Web server software 114 is apportioned between a first portion 114 and a second portion 124, wherein the first portion 114 resides within and is operable on OS 126 at the OS level of a respective one of at least one ID 106 for servicing HTTP requests from MP server 104, and second portion 124 resides within and is operable on UIF 120 at the UIF level of a respective one of at least one ID 106.

It can be appreciated that the present invention enables an Internet web server, which may be mobile, and that is contained within, and that moves with, an ID, and which therefore has a changing IP address, to be accessed by an Internet web browser, such as configurable by the web browser client software 108, with a fixed domain name and static IP address associated with the web server by use of the mobile proxy server.

It is understood that the present invention may take many forms and embodiments. Accordingly, several variations may be made in the foregoing without departing from the spirit or the scope of the invention. For example, instead of connecting the MP to the IWS software 114 via a standard port (e.g., port 80 for HTTP, or 443 for HTTPS), the connection may be made using a non-standard port, or using HTTPS on port 80 instead of HTTP, or using HTTP on port 444 instead of HTTPS. It is also understood that the present invention could be used for protocols other than HTTP, such as FTP, Gopher, and the like.

In another example, the web browser client software 108 may be replaced with any suitable client software effective for IP communications, such as, by way of example, but not limitation, an FTP client program, an email program, or the like.

In a still further example, the IWS software 114 may be replaced with any suitable server software effective for IP communications, such as, by way of example, but not limitation, a news (e.g., NNTP) server, an email (e.g., POP) server, and an FTP server, or the like.

In a still further example, an IP agent client software 116 may check to determine whether the IP address of a respective ID 106 has changed by a respective IP agent client software 116 forwarding the IP address of the respective ID 106 to the IP agent server software 112 on a periodic basis, such as every ten seconds, and the IP agent server software 112 comparing the IP address newly-received from the respective IP agent client software 116 with the previous IP address of the respective ID 106.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for connecting web browser client software to web server software having a dynamic IP address, the system comprising:
    an end user computer having a first processor and first memory, said first memory having web browser client software executable by said first processor;
    a mobile proxy (MP) server in data communication with said end user computer web browser client software, said MP server including a second processor and second memory coupled to the second processor for storing proxy server software and IP agent server software executable by the second processor; and
    at least one Internet device (ID) in data communication with said MP server, said at least one ID including:
        a third processor and third memory coupled to the third processor for storing computer program code executable by the third processor
        an operating system (OS) and a user interface framework (UIF) coupled to said OS, said UIF including at least one object library, said at least one ID being operable at an OS level and at a UIF level, said OS level being distinct from said UIF level;
        at least one web server software having a first portion and a second portion, said first portion residing within and being operable on said OS at said OS level of a respective one of said at least one ID for servicing HTTP requests from said MP server, said second portion residing within and being operable on said UIF at said UIF level of a respective one of said at least one ID; and
        IP agent client software;
    wherein said IP agent client software includes computer program code stored in the third memory and executable by the third processor for:
    determining whether the IP address of said at least one ID has changed;
    upon a determination that said IP address has not changed, repeating the step of determining whether the IP address of said at least one ID has changed;
    upon a determination that said IP address has changed to a new IP address:
    connecting to said IP agent server software; and
    sending message to said IP agent server software informing of said new IP address and domain name represented by said IP agent client software; and
    wherein said IP agent server software includes computer program code stored in the second memory and executable by the second processor for:
    parsing the value of the new IP address and the domain name from said message; and
    forwarding said new IP address to said proxy server software.

2. The system of claim 1, wherein said at least one ID is at least one of at least one cell phone, at least one tablet PC, and at least one web server computer on DHCP (dynamic IP).

3. The system of claim 1, wherein said IWS uses at least one of FTP, NNTP, and Gopher.

4. The system of claim 1, wherein all communications are encrypted.

5. The system of claim 1, wherein said web server uses a proprietary protocol.

6. A system for connecting web browser client software to web server software having a dynamic IP address, the system comprising at least one Internet device (ID) connectable in data communication with a mobile proxy (MP) server having proxy server software and IP agent server software, said MP server being connectable in data communication with an end user computer web browser client software, said at least one ID including:
- a processor and memory coupled to the processor for storing computer program code executable by the processor;
- an operating system (OS) and a user interface framework (UIF) coupled to said OS, said UIF including at least one object library, said at least one ID being operable at an OS level and at a UIF level, said OS level being distinct from said UIF level;
- at least one web server software executable by the processor and having a first portion and a second portion, said first portion residing within and being operable on said OS at said OS level of a respective one of said at least one ID for servicing HTTP requests from said MP server, said second portion residing within and being operable on said UIF at said UIF level of a respective one of said at least one ID; and
- IP agent client software includes computer program code stored in the memory and executable by the processor for:
- determining whether the IP address of said at least one ID has changed;
- upon a determination that said IP address has not changed, repeating the step of determining whether the IP address of said at least one ID has changed;
- upon a determination that said IP address has changed to a new IP address:
- connecting to an IP agent server software; and
- sending message to an IP agent server software informing of said new IP address and domain name represented by said IP agent client software.

7. The system of claim 6, wherein said at least one ID is at least one of at least one cell phone, at least one tablet PC, and at least one web server computer on DHCP (dynamic IP).

8. The system of claim 6, wherein said IWS uses at least one of FTP, NNTP, and Gopher.

9. The system of claim 6, wherein all communications are encrypted.

10. The system of claim 6, wherein said web server uses a proprietary protocol.

11. A method for updating a mobile proxy (MP) server with a new IP address of at least one Internet device (ID), said MP server including proxy server software and IP agent server software, said at least one ID including:
- an operating system (OS) and a user interface framework (UIF) coupled to said OS, said UIF including at least one object library, said at least one ID being operable at an OS level and at a UIF level, said OS level being distinct from said UIF level;
- at least one web server software having a first portion and a second portion, said first portion residing within and being operable on said OS at said OS level of a respective one of said at least one ID for servicing HTTP requests from said MP server, said second portion residing within and being operable on said UIF at said UIF level of a respective one of said at least one ID; and
- IP agent client software;
- wherein the method comprises steps performed by said IP agent client software of:
- determining whether the IP address of said at least one ID has changed;
- upon a determination that said IP address has not changed, repeating the step of determining whether the IP address of said at least one ID has changed;
- upon a determination that said IP address has changed to a new IP address:
- connecting to said IP agent server software; and
- sending message to said IP agent server software informing of said new IP address and domain name represented by said IP agent client software; and
- wherein the method further comprises steps performed by said IP agent server software of:
- parsing the value of the new IP address and the domain name from said message; and
- forwarding said new IP address to said proxy server software.

12. The method of claim 11, wherein said at least one ID is at least one of at least one cell phone, at least one tablet PC, and at least one web server computer on DHCP (dynamic IP).

13. The method of claim 11, wherein said IWS uses at least one of FTP, NNTP, and Gopher.

14. The method of claim 11, wherein all communications are encrypted.

15. The method of claim 11, wherein said web server uses a proprietary protocol.

16. A system for connecting web browser client software to web server software having a dynamic IP address, the system comprising:
- an end user computer having a first processor and first memory, said first memory having web browser client software executable by said first processor;
- a mobile proxy (MP) server in data communication with said end user computer web browser client software, said MP server including a second processor and second memory coupled to the second processor for storing proxy server software and IP agent server software executable by the second processor; and
- at least one Internet device (ID) in data communication with said MP server, said at least one ID including
- a third processor and third memory coupled to the third processor for storing computer program code executable by the third processor;
- an operating system (OS) and a user interface framework (UIF) coupled to said OS, said UIF including at least one object library, said at least one ID being operable at an OS level and at a UIF level, said OS level being distinct from said UIF level;
- at least one web server software executable by the third processor and having a first portion and a second portion, said first portion residing within and being operable on said OS at said OS level of a respective one of said at least one ID for servicing HTTP requests from said MP server, said second portion residing within and being operable on said UIF at said UIF level of a respective one of said at least one ID; and
- IP agent client software includes computer program code stored in the memory and executable by the third processor;
- wherein said proxy server software includes computer program code executable by the second processor for:
- receiving and storing the IP address of said at least one ID,
- receiving a request from the web browser client software,
- forwarding said request to said IWS software,
- receiving a response from said IWS software, and forwarding said response to said web browser client software; and wherein said IP agent client includes computer program code executable by the third processor for:

determining when the IP address of said at least one ID has changed and storing said changed IP address, and forwarding said changed IP address to said IP agent server; and wherein said IP agent server includes computer program code executable by the second processor for:

receiving said changed IP address of said at least one ID, and sending said changed IP address to said proxy server software.

17. The system of claim 16, wherein said at least one ID is at least one of at least one cell phone, at least one tablet PC, and at least one web server computer on DHCP (dynamic IP).

18. The system of claim 16, wherein said web server uses at least one of FTP, NNTP, and Gopher.

19. The system of claim 16, wherein all communications are encrypted.

20. The system of claim 16, wherein said web server uses a proprietary protocol.

* * * * *